United States Patent
Golgiri et al.

(10) Patent No.: US 11,528,330 B2
(45) Date of Patent: Dec. 13, 2022

(54) UPGRADEABLE VEHICLE

(71) Applicant: FORD GLOBAL TECHNOLOGIES, LLC, Dearborn, MI (US)

(72) Inventors: Hamid M. Golgiri, Livonia, MI (US); Patrick Lawrence Jackson Van Hoecke, Livonia, MI (US); Danielle Rosenblatt, Dearborn, MI (US); Anthony Melatti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 617 days.

(21) Appl. No.: 16/212,025

(22) Filed: Dec. 6, 2018

(65) Prior Publication Data
US 2020/0186620 A1    Jun. 11, 2020

(51) Int. Cl.
| | |
|---|---|
| H04L 67/00 | (2022.01) |
| B60W 30/18 | (2012.01) |
| B60W 30/14 | (2006.01) |
| B60W 50/00 | (2006.01) |
| H04W 4/44 | (2018.01) |
| G06F 8/65 | (2018.01) |

(52) U.S. Cl.
CPC ........... *H04L 67/34* (2013.01); *B60W 30/146* (2013.01); *B60W 30/18018* (2013.01); *B60W 50/00* (2013.01); *G06F 8/65* (2013.01); *H04W 4/44* (2018.02); *B60W 2050/0075* (2013.01); *B60W 2400/00* (2013.01); *B60W 2900/00* (2013.01)

(58) Field of Classification Search
CPC ............ G06F 8/65; H04L 67/34; H04W 4/44; B60W 30/146; B60W 30/18018; B60W 50/00; B60W 2050/0075; B60W 2400/00; B60W 2900/00
See application file for complete search history.

(56) References Cited

U.S. PATENT DOCUMENTS

| | | | |
|---|---|---|---|
| 7,895,529 B1 | 2/2011 | Simons et al. | |
| 8,892,297 B2 | 11/2014 | Inbarajan | |
| 9,104,537 B1 | 8/2015 | Penilla et al. | |
| 9,323,546 B2 * | 4/2016 | Rork | G06F 9/44505 |

(Continued)

FOREIGN PATENT DOCUMENTS

| | | |
|---|---|---|
| CN | 104076716 A | 10/2014 |
| WO | 2017078678 A1 | 5/2017 |

OTHER PUBLICATIONS

60/75? $8,500 for battery unlock? (Submitted by FelixMendeldog on Jun. 12, 2012). Retrieved from https://forums.tesla.com//forum/forums/6075-8500-battery-unlock (9 pages).

*Primary Examiner* — Russell Frejd
*Assistant Examiner* — Tarek Elarabi
(74) *Attorney, Agent, or Firm* — Joseph M. Zane; Brooks Kushman P.C.

(57) ABSTRACT

Systems, methods, and computer program products for upgrading a vehicle's functionality based on the manner in which the vehicle is operated. A predefined operating condition of the vehicle that can be assisted by a vehicle feature not presently provided by the vehicle is identified. Thereafter, a notification is communicated to a user interface that indicates availability of the vehicle feature. Subsequently, the vehicle is upgraded to provide the vehicle feature responsive to input to the user interface submitting a request to perform the upgrade.

10 Claims, 2 Drawing Sheets

(56) References Cited

U.S. PATENT DOCUMENTS

| | | | |
|---|---|---|---|
| 9,501,875 B2 | 11/2016 | Gurovich et al. | |
| 9,524,156 B2* | 12/2016 | Pandya | G06F 8/65 |
| 2005/0282519 A1* | 12/2005 | Kobayashi | G06Q 30/06 |
| | | | 455/408 |
| 2007/0182529 A1* | 8/2007 | Dobler | B60K 28/066 |
| | | | 340/438 |
| 2008/0252466 A1* | 10/2008 | Yopp | B60K 28/066 |
| | | | 340/576 |
| 2010/0042498 A1 | 2/2010 | Schalk | |
| 2011/0307336 A1* | 12/2011 | Smirnov | G06F 8/64 |
| | | | 705/14.62 |
| 2013/0314503 A1* | 11/2013 | Nix | G06K 9/00805 |
| | | | 348/46 |
| 2015/0012170 A1 | 1/2015 | Pita-Gil et al. | |
| 2015/0193219 A1* | 7/2015 | Pandya | H04L 67/34 |
| | | | 717/171 |
| 2015/0277942 A1* | 10/2015 | Rork | G06F 8/65 |
| | | | 701/31.4 |
| 2016/0034146 A1 | 2/2016 | Daly, Jr. et al. | |
| 2016/0042576 A1 | 2/2016 | Fischer et al. | |
| 2017/0015246 A1 | 1/2017 | Honghalli Devaraju | |
| 2017/0313268 A1 | 11/2017 | Dalke | |
| 2018/0329950 A1 | 11/2018 | King et al. | |
| 2019/0034197 A1* | 1/2019 | Lin | H04W 4/40 |

* cited by examiner

UPGRADEABLE VEHICLE

TECHNICAL FIELD

Aspects of this disclosure generally relate to upgradeable vehicles.

BACKGROUND

Manufacturers typically offer several optional features for a given vehicle model, with each produced instance of the vehicle model including only a subset of the several available features. Moreover, new vehicle features are often developed for a given vehicle model from year to year. As a driver operates a vehicle, the driver may thus encounter situations that would benefit from an available feature not presently provided by the vehicle.

SUMMARY

In one exemplary embodiment, a vehicle includes a controller configured to, responsive to identifying a predefined vehicle operating condition assisted by a vehicle feature not presently provided by the vehicle, communicate a notification to a user interface that indicates availability of the vehicle feature. The controller is further configured to subsequently upgrade the vehicle to provide the vehicle feature responsive to input to the user interface submitting a request to perform the upgrade.

In another exemplary embodiment, a server includes a processor programmed to, responsive to receiving a request to provide a vehicle with an over-the-air update for a vehicle feature not presently provided by the vehicle, the request communicated to the server responsive to a controller of the vehicle identifying a predefined vehicle operating condition assisted by the feature, communicate the update to the vehicle. The controller is configured to upgrade the vehicle with the feature by installing the update.

In a further embodiment, a method includes, by a controller of a vehicle, identifying a predefined vehicle operating condition assisted by a vehicle feature not presently provided by the vehicle, and responsively communicating a notification to a user interface that indicates availability of the vehicle feature. The method also includes subsequently upgrading the vehicle to provide the vehicle feature responsive to input to the user interface requesting to perform the upgrade.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may be configured to provide a given set of features through various installed hardware components, which may be capable of providing additional features beyond the configured set. For example, a manufacturer may intentionally disable vehicle hardware from providing an available additional feature to lower the price of the vehicle, and/or may include hardware intended to support a feature not yet fully developed at a later time (e.g., futureproofing). As a further example, additional features for a vehicle may be developed after the vehicle is manufactured and sold, where the additional features rely on hardware components already installed in the vehicle, such as installed controllers and sensors.

To therefore ensure that users get the most out of their vehicle, the vehicle may be upgradeable to include one or more of these additional features based on a received over-the-air (OTA) software update that, upon execution by the vehicle, enables the disabled or underutilized hardware components of the vehicle to provide an additional vehicle feature. Moreover, because the number and type of available upgrades may be unknown to a user of a vehicle, the vehicle may be configured to dynamically suggest and implement vehicle upgrades based on the way in which the vehicle is operated. A user is thus informed of additional vehicle features that can assist in a current vehicle situation, a common vehicle situation experienced by the user, or a recent vehicle situation experienced by the user.

Figure 1:
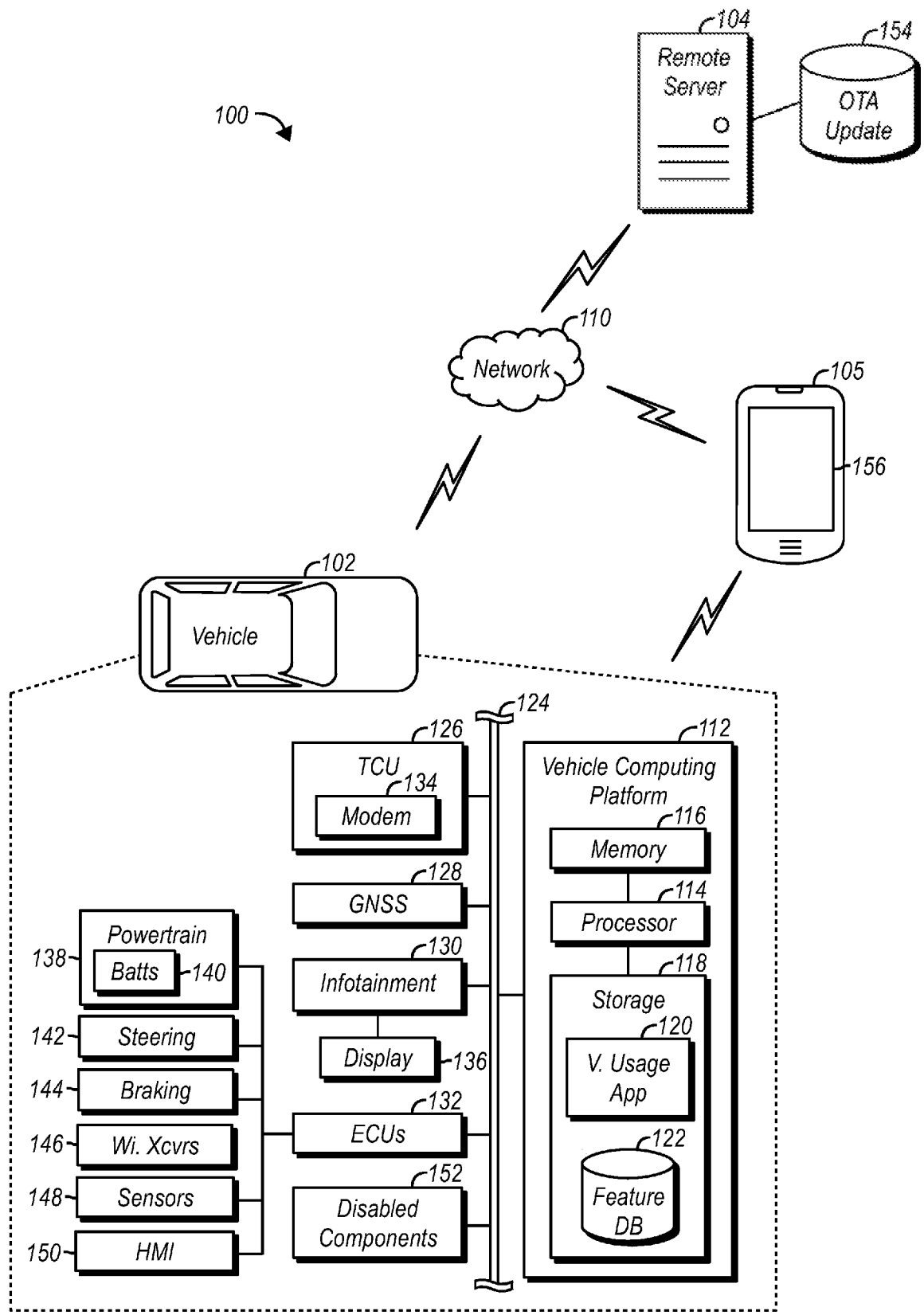
FIG. 1 is a schematic diagram of a system for upgrading a vehicle's functionality based on the manner in which the vehicle is operated.

FIG. 1 illustrates a system 100 for upgrading a vehicle's functionality based on the manner in which the vehicle is operated. The system 100 may include a vehicle 102, a remote server 104, and a mobile device 105. These system 100 components may communicate with one another over a network 110. The network 110 may include one or more interconnected communication networks, such as one or more of the Internet, a cable television distribution network, a satellite link network, a local area network, a wide area network, and a telephone network.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV), or may be an electric vehicle powered by one or more electric motors alone. The vehicle 102 may also be an autonomous vehicle (AV). As the type and configuration of the vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include a unique vehicle identifier, such as a Vehicle Identification Number ("VIN").

The vehicle 102 may include a vehicle computing platform 112 configured to perform functions in support of the features and processes described herein. For example, the vehicle computing platform 112 may be configured to monitor for predefined operating conditions experienced by the vehicle 102, each predefined vehicle operating condition being assisted by an upgraded vehicle feature not presently provided by the vehicle 102. Responsive to identifying a predefined operating condition, the vehicle computing platform 112 may be configured to communicate a notification to a user of the vehicle 102 that indicates availability of the vehicle feature that can assist the condition. For example, the vehicle 102 may include hardware capable of providing the upgraded vehicle feature, but the hardware may not be programmed or include the software necessary to provide the upgraded vehicle feature to a user. Responsive to the user of the vehicle 102 subsequently submitting a request to enable the upgraded vehicle feature, the vehicle computing platform 112 may be configured to upgrade components of the vehicle 102 to enable the vehicle 102 to provide the upgraded vehicle feature.

The vehicle computing platform 112 may include a processor 114, memory 116, and non-volatile storage 118. The processor 114 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 116. The memory 116 may include a single memory device or a plurality of memory devices including, but not limited to, random access memory ("RAM"), volatile memory, non-volatile memory, static random access memory ("SRAM"), dynamic random access memory ("DRAM"), flash memory, cache memory, or any other device capable of storing information. The non-volatile storage 118 may include one or more persistent data storage devices such as a hard drive, optical drive, tape drive, non-volatile solid state device, or any other device capable of persistently storing information.

The processor 114 may be configured to read into memory 116 and execute computer-executable instructions embodied as vehicle software residing in the non-volatile storage 118. This vehicle software may include an operating system and applications, such as a vehicle usage application 120, which may be compiled or interpreted from computer programs created using a variety of programming languages and/or technologies, including, without limitation, and either alone or in combination, JAVA, C, C++, C #, OBJECTIVE C, FORTRAN, PASCAL, JAVA SCRIPT, PYTHON, PERL, and PL/SQL.

The vehicle software may be configured upon execution by the processor 114 of the vehicle computing platform 112 to cause the processor 114 to implement the functions, features, and processes of the vehicle computing platform 112 described herein. For example, the vehicle software upon execution may cause the vehicle computing platform 112 to implement a vehicle usage application 120, which may be a computer process configured to monitor for several predefined vehicle operating conditions. Responsive to identifying an occurrence of one of the predefined vehicle operating conditions, the vehicle usage application 120 may be configured to communicate a notification to the user of the vehicle 102 that indicates availability of a new vehicle feature associated with the predefined vehicle operating condition, and to upgrade components of the vehicle 102 so as to enable the vehicle 102 to provide the new vehicle feature upon request by the vehicle user.

The non-volatile storage 118 of the vehicle computing platform 112 may also include data supporting the functions, features, and processes of the vehicle computing platform 112 described herein. For example, the non-volatile storage 118 may include a feature database 122 that includes records each defining a different predefined vehicle operating condition to be monitored for by the vehicle computing platform 112, and associating the predefined vehicle operating condition with an upgradeable vehicle feature that can assist the associated predefined vehicle operating condition. Responsive to identifying occurrence of the predefined vehicle operating condition of one of the records, the vehicle computing platform 112 may be configured, such as via the vehicle usage application 120, to query the feature database 122 to identify the new vehicle feature to suggest to the user of the vehicle 102 that is included in the one record. The feature database 122 may be arranged within a database organization or structure, including, but not limited to, a relational database, a hierarchical database, a network database, or combinations thereof. A database management system in the form of computer software executing as instructions on the processor 114 may be used to access the information or stored data records of the databases in response to a query, which may be dynamically determined and executed by the vehicle usage application 120.

The vehicle computing platform 112 may communicate with other vehicle 102 components via one or more in-vehicle networks 124. The in-vehicle networks 124 may include one or more of a vehicle controller area network (CAN), an Ethernet network, and a media oriented system transfer (MOST) network. The other vehicle 102 components with which the vehicle computing platform 112 may communicate may include a telematics control unit (TCU) 126, a global navigation satellite system (GNSS) module 128, an infotainment system 130, and various electronic control units (ECUs) 132. Similar to the vehicle computing platform 112, each of these vehicle 102 components may include at least one processor, memory, and non-volatile storage including data supporting the functions, features, and processes of the vehicle 102 component described herein, and including computer-executable instructions that, upon execution by the processor of the vehicle 102 component, causes the processor of the vehicle 102 component to implement the functions, features, and processes of the vehicle 102 component described herein.

The TCU 126 may be configured to facilitate wireless communication between the other vehicle 102 components and the other system 100 components, such as the remote server 104 and the mobile device 105, over the network 110. The TCU 126 may be configured to facilitate such wireless communication via radio frequency (RF) transmissions. For example, the TCU 126 may include a cellular modem 134 or another wireless network transceiver (e.g., Wi-Fi transceiver) configured to connect to the network 110, such as over a cellular network to which the cellular modem 134 is subscribed. The other vehicle 102 components, including the vehicle computing platform 112, may access the communication capabilities of the TCU 126, and thereby communicate with the remote server 104 and mobile device 105 over the network 110, via the in-vehicle networks 124.

The GNSS module 128 of the vehicle 102 may be configured to identify vehicle 102 geographic data, such as via communicating with one or more orbiting satellites over a satellite link network. The vehicle 102 geographic data may include a current location (e.g., latitude and longitude coordinates) and a current bearing of the vehicle 102. The GNSS module 128 may be configured to provide the geographic data to the other vehicle 102 components, such as the vehicle computing platform 112 and/or the infotainment system 130, automatically or on request.

The infotainment system 130 may be configured to provide entertainment and informational services to a user, such as via a GUI shown on a display 136 embedded in the vehicle 102 and driven by the infotainment system 130. For example, the infotainment system 130 may be configured to provide navigation based on geographic data received from the GNSS module 128, radio, streaming music from a connected mobile device 105, hands free telephone calling using a connected mobile device 105, voice command recognition, and providing vehicle applications based on data received from a connected mobile device 105 or from the network 110 (e.g., Internet data, data from the remote server 104). The infotainment system 130 may also be configured to illustrate vehicle information from the other vehicle 102 components, such as the vehicle ECUs 132, and may be configured to receive and process user input for the vehicle 102 components submitted via the display 136, which may include a touch screen mechanism for receiving such user input. For example, the infotainment system 130 may be configured, responsive to receiving user input for a given vehicle 102 component, to communicate instructions corresponding to the input to the given vehicle 102 component for processing.

The vehicle ECUs 132 may be configured to monitor and manage various functions of the vehicle 102 under the power of a battery and/or drivetrain of the vehicle 102. The vehicle ECUs 132 may include, but are not limited to, one or more radio transceiver controllers configured to manage wireless communications with mobile devices 105, key fobs, and other local vehicle 102 devices; one or more powertrain controllers configured to monitor and manage engine components of the vehicle 102 including the battery; one or more body controllers configured to monitor and manage various power control functions such as exterior lighting, interior lighting, keyless entry, remote start, and point of access status verification; one or more climate management controllers configured to monitor and manage heating and cooling system components (e.g., compressor clutch, blower fan, temperature sensors), and one or more driver assistance controllers configured to monitor and manage various safety and convenience features provided by the vehicle 102, such as anti-lock braking, traction control, lane keeping assist, adaptive cruise control (ACC), emergency braking, and other autonomous and semi-autonomous features.

The vehicle ECUs 132 may be connected to one or more vehicle devices and systems that facilitate operation of the vehicle ECUs 132 and other vehicle 102 components discussed above. As shown in the illustrated embodiment, the additional vehicle devices and systems may be directly connected to the vehicle ECUs 132, and may be accessible by the vehicle 102 components, such as the vehicle computing platform 112, over the in-vehicle networks 124 and via the ECUs 132. Alternatively, or additionally, one or more of the additional vehicle devices and systems may be directly connected to the other vehicle 102 components, such as the vehicle computing platform 112, or may be directly connected to and accessible by the vehicle 102 components over the in-vehicle networks 124.

The additional vehicle devices and systems may include driving systems such as a powertrain 138, which may include a combustion engine and/or an electric motor of the vehicle 102, and may include one or more batteries 140 powering the electric motor and/or the various electronic components of the vehicle 102. One or more of the ECUs 132, such as the powertrain controller, may be configured to monitor and manage operation of the batteries 140, including the rate at which the batteries 140 are charged and discharged. The driving systems may further include a steering system 142 and braking system 144 of the vehicle 102. The ECUs 132 may be configured to monitor and generate operational data indicating the status of each of these systems (e.g., RPMs, steering angle, and braking force), and may be configured to operate each of these systems so as to provide the various convenience and safety features, such as adaptive cruise control and autonomous driving.

The additional vehicle devices and systems may further include one or more wireless transceivers 146 configured to establish local wireless connections between the vehicle 102 and other devices, such as the mobile device 105, via RF transmissions. The wireless transceivers 146 (and the mobile device 105) may include, without limitation, a Bluetooth transceiver, a ZigBee transceiver, a Wi-Fi transceiver, a radio-frequency identification ("RFID") transceiver, a near-field communication ("NFC") transceiver, and/or a transceiver designed for another RF protocol particular to a remote service provided by the vehicle 102. For example, the wireless transceivers 146 may facilitate vehicle 102 services such as keyless entry, remote start, passive entry passive start, and facilitate services of the infotainment system 130 involving the mobile device 105.

The additional vehicle devices and systems may further include sensors 148 configured to generate proximate data indicative of the vehicle 102 environment. Specifically, the sensors 148 may be configured to detect objects proximate the vehicle 102, and to generate data indicative of the existence and current operating state of each proximate object. An object, which may include other vehicles, curbs, guard rails, lane lines, pedestrians, and stationary objects in the road such as construction barriers and debris, may be considered as "proximate" the vehicle 102 when the object is within a particular distance from the vehicle 102, which may be based on the detection strength of the sensors 148. The generated data may be communicated to the ECUs 132 and other vehicle 102 components, such as the infotainment system 130, which may be configured to responsively implement safety and convenience features based on the data. For example, the ECUs 132 may be configured to implement features such as emergency breaking, adaptive cruise control, and autonomous operation. The ECUs 132 and/or infotainment system 130 may also be configured to provide audio and/or visual guidance for maneuvering tight spaces based on the received data.

As an example, the sensors 148 may include one or more LIDAR sensors. The LIDAR sensors may each be configured to measure a distance to an object external and proximate to the vehicle 102 by illuminating the object with a pulsed laser light and measuring the reflected pulses with a sensor. The ECUs 132 may identify the differences in laser return times and, based on these measured differences and the received wavelengths, may generate a digital 3-D representation of the object. The LIDAR sensors may include laser emitters, laser receivers, and any other suitable LIDAR vehicle sensor components. The LIDAR sensors may further be arranged within a housing configured to rotate to facilitate scanning of the environment.

The sensors 148 may also include one or more cameras for capturing images of the environment surrounding a vehicle 102. For example, the sensors 148 may include a forward-facing camera that is mounted to the rear-view mirror of the vehicle 102 and is configured to collect image data of the environment in front of the vehicle 102. Similarly, the sensors 148 may include a rear-facing camera that is mounted to the trunk of the vehicle 102 and is configured to collect image data of the environment behind the vehicle 102, and may include side-facing cameras that are mounted to the side view mirrors of the vehicle 102 and are configured to collect image data of the environment to each side of the vehicle 102. The ECUs 132 may be configured process the image data captured by the one or more cameras of the vehicle 102 to identify conditions around the vehicle 102, including, for example, the existence and operating state of objects proximate the vehicle 102. The infotainment system 130 may be configured to receive and display the image data on the display 136, such as to assist a driver when navigating tight spaces.

As additional examples, the sensors 148 may include one or more radar sensors, one or more ultrasonic sensors, and/or any other sensors for detecting information about the surroundings of the vehicle 102. The sensors 148 may be mounted anywhere on the vehicle. For example, a sensor 148 may be mounted on a roof of the vehicle 102 so as to have a three hundred sixty-degree view of the environment surrounding of the vehicle 102. Additionally, or alternatively, various sensors 148 may surround the vehicle 102 to provide a three hundred sixty-degree view of the vehicle 102. The vehicle 102 may include actuators for adjusting an angle of the field of view of the various sensors 148.

The sensors 148 may also include one or more sensors configured to generate operational data indicative of the current operating state of the vehicle 102. As some non-limiting examples, these operation sensors may include a speed sensor configured to measure and indicate a current speed of the vehicle 102, an accelerometer configured to measure and indicate a current acceleration level of the vehicle 102, an odometer configured to measure and indicate a current distance traveled by the vehicle 102, and a gyroscope or compass configured to identify and indicate a current heading of the vehicle 102. One or more of these operational sensors may be integrated with other vehicle devices and systems, such as the powertrain 138, steering system 142, and braking system 144, and function to enable the ECUs 132 to monitor the status of the other vehicle devices and systems. The geographic data generated by the GNSS module 128 and described above may be considered as operational data indicative of the current operating state of the vehicle 102.

The vehicle devices and systems may further include a human machine interface (HMI) 150, also referred to herein as a user interface, having several components configured to facilitate user interaction with the vehicle 102 components, such as the ECUs 132 and the infotainment system 130. The HMI 150 may include one or more video and alphanumeric integrated displays, a speaker system, and any other suitable audio and visual indicators capable of providing data from the vehicle 102 components to a user. The HMI 150 may also include a microphone, physical controls, and any other suitable devices capable of receiving input from a user to invoke functions of the vehicle 102 components. The physical controls may include an alphanumeric keyboard, a pointing device (e.g., mouse), keypads, pushbuttons, and control knobs. As a specific example, the physical controls may include steering wheel audio buttons, a push-to-talk button, instrument panel controls, and the like. A display of the HMI 150 may be an integrated touch screen display that includes a touch screen mechanism for receiving user input.

One of the vehicle ECUs 132 may function as an HMI controller configured to receive user input from the HMI 150 for the various vehicle 102 components, and forward the input to the vehicle 102 component for which the input is intended. The HMI controller may also be configured to receive data from the other vehicle 102 components and forward such data to the HMI 150 for provision to a user. Additionally, or alternatively, one or more of the other vehicle 102 components, such as the various ECUs 132 and/or the infotainment system 130, may each be directly connected to HMI 150 components specific to facilitating user interaction with the respective vehicle 102 component (e.g., climate switches connected to the climate controller, cruise control switches connected to the convenience and safety controllers, menu navigational controls connected to the infotainment system 130).

The vehicle 102 may further include one or more disabled hardware components 152. The disabled hardware components 152 may include inactive hardware components, namely, electronic devices that are inactive during operation of the vehicle 102, and are locked from being activated absent installation of a software update. In other words, a disabled hardware component 152 may support a vehicle 102 feature that becomes available to the driver of the vehicle 102 responsive to installation of a software update that causes the vehicle 102 to activate the vehicle feature. The disabled hardware components 152 may include one or more components that are similar to and/or upgraded versions of the vehicle 102 components, devices and systems discussed above. For example, the disabled hardware components 152 may include an inactive TCU 126 or modem 134, an inactive GNSS module 128, an inactive ECU 132, an inactive component of the powertrain 138 (e.g., an inactive battery 140, steering system 142, or braking system 144), an inactive wireless transceiver 146, an inactive sensor 148, and/or an inactive HMI 150 component, or an inactive component that is an upgraded version of one of the above vehicle 102 components, devices, and systems (e.g., a modem having faster connectivity than a currently available modem 134).

Similar to the vehicle computing platform 112, the remote server 104 and the mobile device 105 may include at least one processor, memory, and non-volatile storage including data supporting the features, functions, and processes of the remote server 104 and mobile device 105 respectively described herein, and computer-executable instructions that, upon execution by the at least one processor of the remote server 104 and the mobile device 105 respectively, causes the at least one processor to implement the functions, features, and processes of the remote server 104 and mobile device 105 respectively described herein.

The remote server 104 may have access to an over-the-air (OTA) update database 154, which may be stored in the non-volatile storage of the remote server 104, or may be accessible by the remote server 104 over a network, such as the network 110. The OTA update database 154, which may be made up of several sub-databases, may associate each of various upgradable vehicle features with an OTA update. Each OTA update, which may be a software update or a firmware update, may be configured, upon receipt by the vehicle 102, to cause the vehicle 102 to provide a feature not currently provided by the vehicle 102.

The mobile device 105, which may be a cellular phone as illustrated, or may be a personal computer or tablet, may include a modem similar to the modem 134 of the vehicle 102 for communicating with the vehicle 102 and the remote server 104 over the network 110, and may include wireless transceivers similar to the wireless transceivers 146 of the vehicle 102 for establishing local connections with the vehicle 102. The mobile device 105 may further include an HMI, or user interface, including an integrated touch screen display 156. A user may interact with the touch screen display 156 of the mobile device 105 to communicate commands to the vehicle 102, such as directly via the wireless transceivers 146 or over the network 110 via the TCU 126. In addition, the vehicle 102 components, such as the vehicle computing platform 112, may provide data to the mobile device 105, such as notifications to be illustrated on the display 156 of the mobile device 105. In addition or alternatively, the mobile device 105 may receive notifications for illustration on its display 156 from the remote server 104 over the network 110.

While an exemplary system 100 is shown in FIG. 1, the example is not intended to be limiting. Indeed, the system 100 may have more or fewer components, and alternative components and/or implementations may be used. For example, two or more of the above-described vehicle 102 components may be combined into a single vehicle 102 component connected to the in-vehicle networks 124, one of the above-described vehicle 102 components may be configured to perform one or more of the described functions of one or more other vehicle 102 components, and the described functions of one of the vehicle 102 components may be spread across two or more vehicle 102 components each separately connected to the in-vehicle networks 124. The vehicle 102 may also include another component in addition to the vehicle 102 components described above that is separately connected to the in-vehicle networks 124 and is configured to implement at least some of the described functions of one or more other vehicle 102 components.

Figure 2:
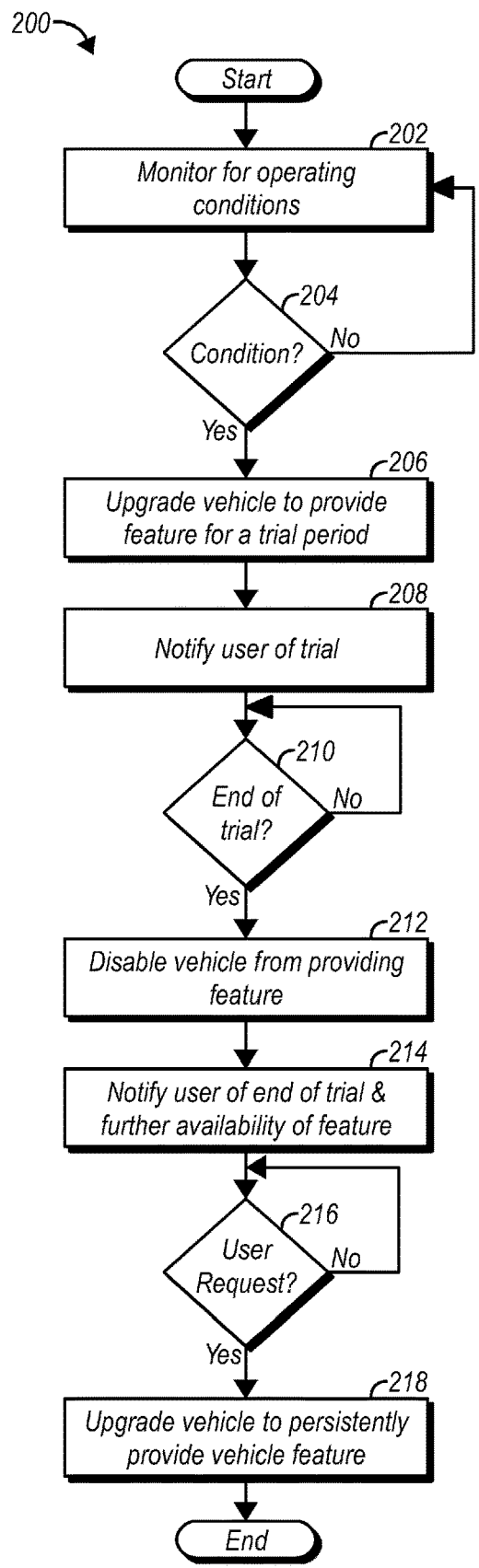
FIG. 2 is a flowchart of a process for upgrading a vehicle's functionality based on the manner in which the vehicle is operated that may be performed by the system of FIG. 1.

FIG. 2 illustrates a process 200 for upgrading a vehicle's functionality to enable the vehicle to provide a feature previously not provided by the vehicle. The process 200 may be performed by the system 100, or more particularly by the vehicle computing platform 112 of the vehicle 102.

In block 202, predefined operating conditions may be monitored for. In particular, the vehicle computing platform 112 may be configured to monitor whether the vehicle 102 experiences one of the predefined vehicle operating conditions defined in the feature database 122. The vehicle computing platform 112 may be configured to determine whether one of the predefined vehicle operating conditions occurs based on data, such as the vehicle operation data and/or the proximity data, generated by the other vehicle 102 components, devices, and systems and passed over the in-vehicle networks 124 (e.g., CAN).

For example, a predefined vehicle operating condition included in the feature database 122 may be when a vehicle traveling immediately in front of the vehicle 102 decelerates below a threshold speed (e.g., 20 MPH) a preset number of times while standard adaptive cruise control is enabled for the vehicle 102. The vehicle computing platform 112 may be configured to identify this exemplary predefined operating condition based on proximity data generated by sensors 148, which may identify the operating state of a vehicle immediately in front of the vehicle 102, and/or based on the vehicle operation data generated by the driving systems (e.g., powertrain 138, steering system 142, braking system 144) and/or sensors 148, which may indicate when the vehicle 102 is below and above the threshold speed.

Standard adaptive cruise control may be limited to only controlling the vehicle 102 above a given speed, which may be equal to the threshold speed. This exemplary predefined vehicle operating condition may thus present a good opportunity to suggest adaptive cruise control with stop and go to a driver, which may be the proposed vehicle feature associated with the exemplary predefined vehicle operating condition within the feature database 122. Adaptive cruise control with stop and go may enable the vehicle 102, or more particularly the ECUs 132, to automatically operate the powertrain 138 and braking system 144 to bring the vehicle 102 to and from a complete stop based on the operating state of objects detected in front of the vehicle 102.

As another example, when the vehicle 102 is an electric or hybrid vehicle having one or more batteries 140 configured to power an electric motor, a standard configuration of the batteries 140 may enable the batteries 140 to power the electric motor of the vehicle 102 for a given range when fully charged. In this case, one of the predefined vehicle operating conditions may be a set percentage of the trips of the vehicle 102 exceeding the given range. A "trip" of the vehicle 102 may be defined in various ways, such as each sequence of the vehicle 102 being started, moved, parked, and turned off, each instance of the vehicle 102 traveling from a starting point to a destination set via the infotainment system 130, or each instance of the vehicle 102 leaving and thereafter returning to a set home location. The vehicle computing platform 112 may be configured to identify whether this exemplary predefined vehicle operating condition has occurred based on the vehicle operation data generated by the vehicle 102 components, devices, and systems, such as the GNSS module 128, the vehicle driving systems, and the sensors 148, which may indicate where the vehicle 102 is located, whether the vehicle 102 is powered on, and whether the vehicle 102 is in motion. Upgrading the one or more batteries 140 to have a greater capacity and correspondingly to power the electric motor for a range greater than the given range for the standard configuration of the batteries 140 may be the upgraded vehicle feature associated with this exemplary predefined vehicle operating condition in the feature database 122.

In block 204, a determination of whether one of the predefined vehicle operating conditions of the feature database 122 has occurred may be determined, such as by the vehicle computing platform 112, based on the proximity data and operational data generated by the other vehicle 102 components, devices, and systems. Responsive to identifying occurrence of one of the predefined vehicle operating conditions ("Yes" branch of block 204), in block 206, the vehicle 102 may be upgraded to provide the vehicle feature associated with the identified predefined vehicle operating condition in the feature database 122 for a trial period. Specifically, the vehicle computing platform 112 may be configured to install a software update that causes the vehicle 102, or more particularly the vehicle 102 components, devices, and systems, to provide and/or enable use of the vehicle feature by a user.

For example, the vehicle computing platform 112 may include, such as in the feature database 122, executable software instructions for enabling the vehicle feature associated with the identified predefined vehicle operating condition. In this case, the vehicle computing platform 112 may be configured to execute such instructions, such as by updating any vehicle 102 components and activating any disabled hardware components 152 needed to enable the vehicle 102 to provide the new vehicle feature. For instance, if the vehicle feature is adaptive cruise control with stop and go, the vehicle computing platform 112 may update the ECUs 132 to include programming that provides the stop and go capability, and enables any previously disabled sensors needed for the functionality. Alternatively, if the vehicle feature is upgraded batteries 140, then the vehicle computing platform 112 may update the software of the batteries 140 and/or managing ECUs 132 to include programming that implements the upgraded batteries 140. As a further example, if the vehicle feature is a new or faster telematics service, the vehicle computing platform 112 may install updated software on the infotainment system 130 or TCU 126 to enable implementation of the new or faster telematics service, and, in the case of faster service, may also install software that activates a previously disabled modem that is faster than a currently active modem 134.

In alternative embodiments, rather than already being in possession of the updates for implementing a new vehicle feature, the vehicle computing platform 112 may be configured to submit a request to the remote server 104 that identifies the vehicle feature to be enabled. Responsive to receiving the request, the remote server 104 may be configured to query the OTA update database 154 for the OTA update corresponding to the requested vehicle feature, and to transmit the returned OTA update to the vehicle computing platform 112 via the TCU 126. The vehicle computing platform 112 may then be configured to upgrade the vehicle 102 to provide the vehicle feature for the trial period by installing the received OTA update received from the remote server 104.

In block 208, the driver of the vehicle 102 may be notified of the trial for the vehicle feature. For example, the vehicle computing platform 112 may be configured to communicate the notification to the driver via the display 136 of the infotainment system 130. The notification displayed to the driver may identify the vehicle feature being provided for the trial period, may include a remaining length of the trial period, and may include instructions for accessing the new vehicle feature, such as if the new vehicle feature is not automatically activated upon the vehicle 102 being started. For example, a driver may have to interact with the HMI 150 of the vehicle 102 in order for adaptive cruise control with stop and go to become active. In addition or alternatively, similar notifications may be communicated to the driver's mobile device 105 for illustration on the display 156, such as via the TCU 126 and/or the wireless transceivers 146 if a local connection has been established, or from the remote server 104 responsive to receiving the vehicle feature request from the vehicle 102.

In block 210, a determination may be made of whether the trial period has ended. Specifically, the vehicle computing platform 112 may be configured to implement a timer tracking the passage of time from when the vehicle 102 is upgraded to provide the new feature. Responsive to determining that the value tracked by the timer is greater than the trial period, the vehicle computing platform 112 may be configured to determine that the trial period for the new feature is over.

Responsive to completion of the trial period ("Yes" branch of block 210), in block 212, the vehicle 102 may be disabled from providing the new feature. Specifically, the vehicle computing platform 112 may be configured to disable the vehicle 102 from providing the new feature by manipulating the code installed on the vehicle 102 components, devices, and systems, and/or disabling hardware components that were enabled to provide the new feature. For example, the vehicle computing platform 112 may execute uninstaller programs configured to uninstall the updates that enabled the vehicle feature. Alternatively, prior to installing the updates, the vehicle computing platform 112 may be configured to create a restore point that includes a current image of each implicated vehicle 102 component, device, and system. The vehicle computing platform 112 may then disable the vehicle 102 from providing the new feature by copying the image data of the restore point to the implicated vehicle 102 components.

In block 214, the driver of the vehicle 102 may be communicated a notification informing that the trial period for the new vehicle feature is over. The communicated notification may also indicate that the vehicle 102 may be upgraded to persistently provide the vehicle feature, such as in response to a request and payment from the driver. In particular, the vehicle usage application 120 may be configured to communicate the notification to the driver via the display 136 of the infotainment system 130, and/or via the display 156 of the mobile device 105.

In alternative embodiments, the time remaining of the trial period may be tracked by the remote server 104, such as in response to receiving a request for an OTA update for a given vehicle feature. In this case, responsive to the trial period ending, the remote server 104 may be configured to communicate a signal to the vehicle 102 over the network 110 that causes the vehicle computing platform 112 to disable the vehicle feature as described above, and may be configured to communicate the notification to the mobile device 105 over the network 110 indicating that the trial period has ended.

Subsequently, in block 216, a determination may be made whether the driver submits input requesting to upgrade the vehicle 102 to provide the vehicle feature on a persistent basis. Such a request may be received from the user via the display 136 of the vehicle 102, via the HMI 150, or via the user interface (e.g., touch screen display 156) of the mobile device 105. For instance, the notification communicated to the driver via the infotainment system 130 or via the display 156 of the mobile device 105 indicating that the vehicle 102 can be upgraded to persistently provide the vehicle feature may include an interactive virtual button that, upon selection by the driver, causes the infotainment system 130 or mobile device 105, respectively, to communicate a request for the vehicle feature to the vehicle computing platform 112. The vehicle computing platform 112 may then proceed to install updates that enable the vehicle 102 components, devices, and systems to provide the requested vehicle feature.

Responsive to input by the driver submitting such a request ("Yes" branch of block 216), in block 218, the vehicle 102 may be upgraded to persistently provide the vehicle feature. Specifically, the vehicle computing platform 112 may be configured to install updates to the vehicle 102 components, devices, and systems implicated by the vehicle feature that cause such vehicle 102 components, devices, and systems to provide the vehicle feature. Such updates may be stored in the feature database 122 in association with the vehicle feature, may be OTA updates received from the remote server 104 in connection with implementing the vehicle feature for the trial period, or may be OTA updates requested and received from the remote server 104 responsive to the driver submitting the request.

In some embodiments, blocks 206 to blocks 212 may be omitted from the process 200, and block 214 may, instead of indicating the end of the trial, indicate simply that the vehicle 102 may be upgraded upon user request to provide the vehicle feature capable of assisting the identified predefined vehicle operating condition. Moreover, responsive to a predefined vehicle operating condition being identified in block 204, and to the user being notified of the vehicle feature in block 214, communication of a further notification indicating availability of the vehicle feature may be prevented for a preset time period. In other words, responsive to the vehicle computing platform 112 identifying a predefined vehicle operating condition associated with a given vehicle feature within the feature database 122 ("Yes" branch of block 204), and/or to communicating to the user a notification indicating the given vehicle feature, the vehicle computing platform 112 may be configured to initiate a timer associated with the identified predefined vehicle operating condition and vehicle feature. Responsive to a subsequent identification of the predefined vehicle operating condition, the vehicle computing platform 112 may compare the value of the timer to the preset time period. If the time passage from the earlier identification and/or notification based thereon, which may be represented by the value of the timer, is less than preset time period, the vehicle computing platform 112 may be configured to prevent communication of a notification indicating availability of the associated vehicle feature. In this way, the vehicle computing platform 112 may avoid driver annoyances and distractions caused from notifications for the same upgradable features within a given time period.

In some embodiments, one or more of the blocks of the process 200 may be performed contemporaneously with (e.g., occurring during, in response to, or very soon after) certain predefined events of the vehicle 102. For example, when a predefined vehicle operating condition is identified during a trip of the vehicle 102, the vehicle computing platform 112 may be configured to perform blocks 206 and/or 208 contemporaneously with the trip being completed, or contemporaneously with a next power on event of the vehicle 102 after the trip is completed. Similarly, the vehicle computing platform 112 may be configured to perform blocks 212 and/or 214 of the process 200 contemporaneously with the trip being completed, or contemporaneously with a next vehicle 102 power on event after the trip is completed. In this way, the user is not distracted with notifications while operating the vehicle 102 during a trip.

A vehicle may be capable of being upgraded to provide additional features via OTA software updates, which enables upgrading the vehicle on the fly without having to take the vehicle to a dealership or other vehicle service retail location. However, the user of the vehicle may not be aware of the several available upgrades, including those that would benefit the particular way in which the user operates the vehicle. Accordingly, the vehicle may be configured to dynamically suggest and implement vehicle upgrades based on the way in which the vehicle is operated. A user is thus informed and able to take advantage of additional vehicle features that are particularly beneficial to the user.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A vehicle comprising:
   a first controller configured to
      identify a vehicle software feature configured to assist an occurring predefined vehicle operating condition, where the vehicle software feature is available for the vehicle but not presently installed to the vehicle;
      communicate a notification to a user interface that indicates availability of the vehicle software feature; and
      subsequently, upgrade the vehicle to provide the vehicle software feature responsive to input to the user interface submitting a request to perform the upgrade; and
   a second controller configured to implement adaptive cruise control, wherein the predefined vehicle operating condition is a second vehicle driving immediately in front of the vehicle decelerates to below a threshold speed a preset number of times, and the vehicle software feature is adaptive cruise control with stop and go.

2. The vehicle of claim 1, further comprising:
   an electric motor; and
   a battery configured for a first range powering the electric motor,
   wherein the predefined vehicle operating condition is a percentage of trips exceeding the first range, and the vehicle software feature is the battery being configured for a second range greater than the first range.

3. The vehicle of claim 1, wherein the first controller is configured to upgrade the vehicle to provide the vehicle software feature by installing an over-the-air update received from a remote server responsive to the input submitting the request.

4. The vehicle of claim 1, wherein the first controller is configured to upgrade the vehicle to provide the vehicle software feature by activating an inactive hardware component of the vehicle.

5. The vehicle of claim 1, wherein the first controller is configured to, responsive to identifying the predefined vehicle operating condition assisted by the vehicle software feature that is not presently provided by the vehicle:
   upgrade the vehicle to provide a trial period of the vehicle software feature; and
   responsive to completion of the trial period
      disable the vehicle from providing the vehicle software feature, and
      communicate a notification to the user interface informing that the trial period for the vehicle software feature is over.

6. The vehicle of claim 1, wherein the first controller is configured to, responsive to communicating the notification to the user interface that indicates availability of the vehicle software feature, prevent communication of a further notification indicating availability of the vehicle software feature for a preset time period.

7. The vehicle of claim 1, further comprising:
   non-volatile storage storing a database including records each associating a vehicle software feature not presently provided by the vehicle with a predefined vehicle operating condition assisted by the vehicle software feature, wherein the first controller is configured to
   monitor for the predefined vehicle operating condition of each of the records based on vehicle operation data received from a controller area network of the vehicle; and
   responsive to detecting the predefined vehicle operating condition of one of the records based on the vehicle operation data, communicate a notification to the user interface that indicates the vehicle can be upgraded to include the vehicle software feature of the one record.

8. The vehicle of claim 1, wherein the predefined vehicle operating condition is identified by the first controller during a trip of the vehicle, and the first controller is configured to communicate the notification contemporaneously with the trip being completed or contemporaneously with a next power on event of the vehicle after completion of the trip.

9. The vehicle of claim 1, wherein the user interface is a touch screen display integrated with the vehicle.

10. The vehicle of claim 1, wherein the user interface includes a display of a mobile device.

* * * * *